(12) United States Patent
Meredith

(10) Patent No.: US 6,217,450 B1
(45) Date of Patent: *Apr. 17, 2001

(54) COMPUTERIZED POOL CUE

(76) Inventor: Christopher Meredith, 3 Whero La., Nantucket, MA (US) 02554

(*) Notice: Subject to any disclaimer, the term of this patent is extended or adjusted under 35 U.S.C. 154(b) by 0 days.

This patent is subject to a terminal disclaimer.

(21) Appl. No.: 09/176,825

(22) Filed: Oct. 22, 1998

Related U.S. Application Data

(60) Provisional application No. 60/063,033, filed on Oct. 23, 1997.

(51) Int. Cl.⁷ .................................................. A63F 13/06
(52) U.S. Cl. ........................ 463/37; 273/148 B; 463/2
(58) Field of Search .................... 463/2, 37, 47; 273/108.1, 123 R, 148 B; 473/2, 44, 45, 40

(56) References Cited

U.S. PATENT DOCUMENTS

| | | |
|---|---|---|
| D. 300,235 | 3/1989 | Nicotra . |
| D. 312,290 | 11/1990 | Rodriguez . |
| D. 354,106 | 1/1995 | Thompson . |
| 2,931,649 * | 4/1960 | Furda ........................ 273/23 |
| 3,091,466 | 5/1963 | Speiser . |
| 3,508,440 | 4/1970 | Murphy . |
| 3,633,007 | 1/1972 | Sanders . |
| 3,633,008 | 1/1972 | Sanders . |
| 4,053,153 * | 10/1977 | Josenhans ................... 273/23 |
| 4,086,630 | 4/1978 | Speiser et al. . |
| 4,954,817 | 9/1990 | Levine . |
| 5,066,008 | 11/1991 | Rivera . |
| 5,175,534 | 12/1992 | Thatcher . |
| 5,181,718 | 1/1993 | Valentine . |
| 5,195,744 | 3/1993 | Kapp et al. . |
| 5,203,563 | 4/1993 | Loper, III . |
| 5,232,223 * | 8/1993 | Dornbusch ................. 273/148 B |
| 5,238,457 | 8/1993 | Triplett . |
| 5,295,682 | 3/1994 | Leonard . |
| 5,317,336 * | 5/1994 | Hall ............................ 345/164 |
| 5,362,069 | 11/1994 | Hall-Tipping . |
| 5,368,484 | 11/1994 | Copperman et al. . |
| 5,474,502 | 12/1995 | Brown . |
| 5,542,672 * | 8/1996 | Meredith .................... 463/37 |
| 5,782,693 | 7/1998 | Jordan et al. . |
| 5,841,426 | 11/1998 | Dodson et al. . |
| 5,846,137 | 12/1998 | Tremblay . |
| 5,853,333 * | 12/1998 | Patterson ..................... 473/42 |

* cited by examiner

*Primary Examiner*—Valencia Martin-Wallace
*Assistant Examiner*—Julie Kasick
(74) *Attorney, Agent, or Firm*—Weingram & Associates, P.C.

(57) ABSTRACT

A computerized pool cue and a controller device are provided which are connected to a computer screen to simulate and display playing a game of pool or billiards. The pool cue is supported above an underlying surface for movement in at least two dimensions with respect to the underlying surface. Movement of the pool cue with respect to game balls in play is shown on the computer screen. A signal is generated from the pool cue to the computer for coaction with software to simulate the game of pool or billiards on the computer screen without using actual game balls.

5 Claims, 10 Drawing Sheets

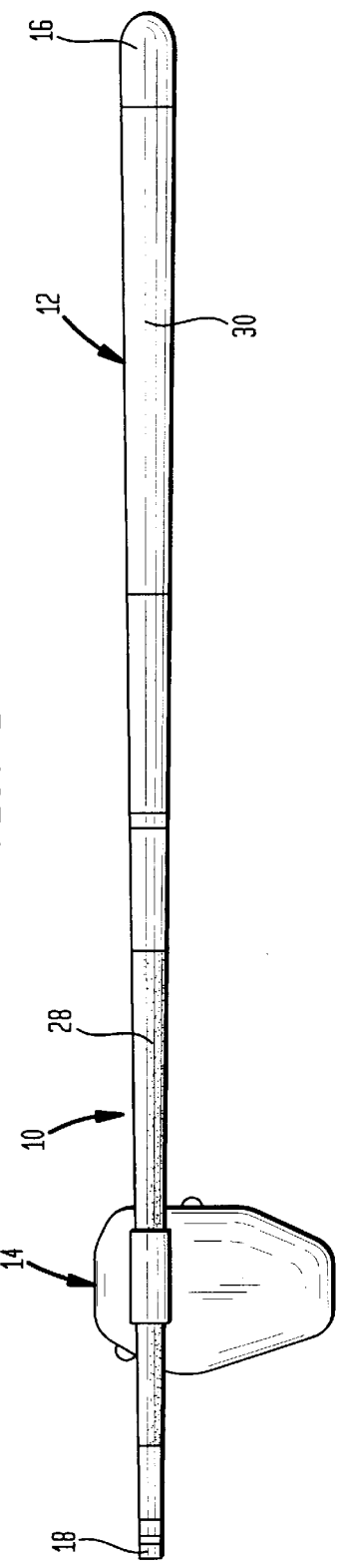
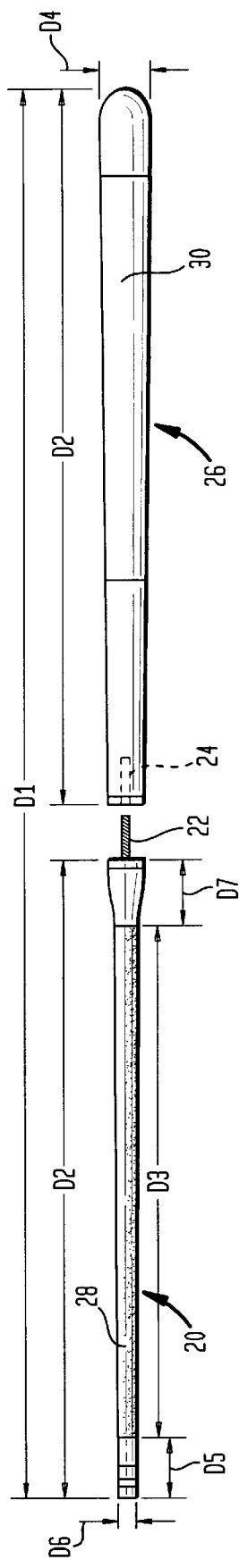

COMPUTERIZED POOL CUE

This appln claims the benefit of Provisional No. 60/063,033 filed Oct. 23, 1997.

BACKGROUND OF THE INVENTION

1. Field of the Invention

The present invention relates to computer pool games and in particular, to a computerized pool cue and controller to simulate the action and feel of using a pool cue.

2. Description of the Related Art

Devices and systems are known to simulate leisure activities such as golf, pool or billiards and fishing. For example,

| U.S. Pat. No. | Inventor(s) |
| --- | --- |
| 3,091,466 | Speiser |
| 3,508,440 | Murphy |
| 3,633,007 | Sanders |
| 3,633,008 | Sanders |
| 4,086,630 | Speiser, et al. |
| 5,066,008 | Rivera |

U.S. Pat. No. 3,091,466 to Speiser discloses a computer-type golf game which consists of an impact screen element and photocell units. Upon impact of a golf ball upon the screen, the screen is distorted from its normally planar condition to permit at least one of the photocell units to generate a signal which will indicate the completion of flight of the golf ball.

U.S. Pat. No. 3,508,440 to Murphy discloses a golf game consisting of a detecting means for when the ball has been hit from a tee and a location means for determining when the ball has reached a predetermined locale, and a computing means for providing information relative to the trajectory of the flight of the ball hit from the tee.

U.S. Pat. No. 3,633,007 to Sanders discloses a golf game computer having an improved drag circuit to provide a representation of the instantaneous velocity of the golf ball.

U.S. Pat. No. 3,633,008 to Sanders discloses a golf game computer having a bounce and roll generator.

U.S. Pat. No. 4,086,630 to Speiser et al. discloses a computer type golf game having a visible fairway display, whereby attained yardage as indicated by the computer activates the progression of slides to a projection position to simulate a different area on the fairway.

U.S. Pat. No. 5,066,008 to Rivera discloses an electronic voice and control system for billiards which keeps score and is connected to audio and visual input/output elements. The system includes sensors at each of the pockets of the billiard table and open switches designed to close when a ball enters a particular pocket so that various aspects, players scores, "scratch", etc., can be indicated. In a preferred embodiment, each one of the object balls is coated with a magnetic material so that a magnetic sensing means can sense when the particular ball has entered a pocket.

In addition, a fishing rod and reel electronic game controller is disclosed in my U.S. Pat. No. 5,542,672 which issued Aug. 6, 1996.

Among the known devices and systems, there is no disclosure of a pool cue in combination with a joy stick and mouse to provide a user with the "feel" of the resistance encountered when using a pool cue.

OBJECTS AND SUMMARY OF THE INVENTION

It is an object of the present invention to provide a computerized pool cue and controller for a user to play a game of pool or billiards (hereinafter referred to as "pool") and experience the feel of actually using the pool stick through software simulation. The actual motion of the pool stick provides the simulation of playing a game of pool and signals the results of a cue stroke by software simulation.

It is another object of the present invention to provide a device which permits the user to move the pool cue and select different forms of "English" to be applied to a pool ball.

It is another object of the present invention to provide the controller as a modification of a computer mouse.

It is another object of the present invention to provide a computerized pool cue and controller which uses standard mouse and keyboard commands to control the software for the system.

A preferred embodiment of the invention includes a housing adapted to move over a flat surface, the housing including a stalk extending upwardly from the housing and supporting a tapered tubular or ring-like member adapted to receive a pool cue, sensing means in the housing, the stalk and the tubular member to sense the position and movement of the pool cue and send this information to circuitry which processes the information for input into a computer, which in turn uses appropriate compatible software to display the effects of the pool cue activity.

BRIEF DESCRIPTION OF THE DRAWINGS

For a more complete understanding of the present invention, reference may be had to the following detailed description of the preferred embodiments taken in connection with the drawings, of which:

FIG. 1 is a top plan view of a computerized pool cue mounted for use with a controller according to the present invention;

Figure 5A:
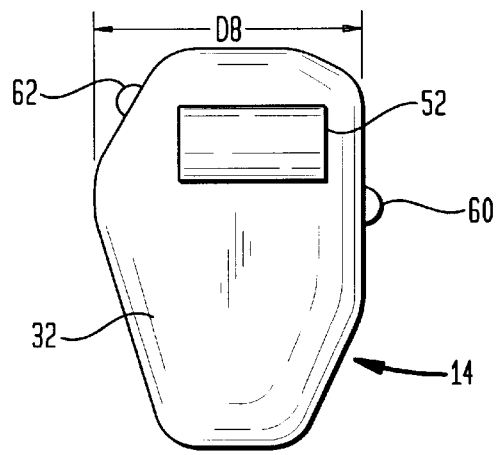
Figure 5B:
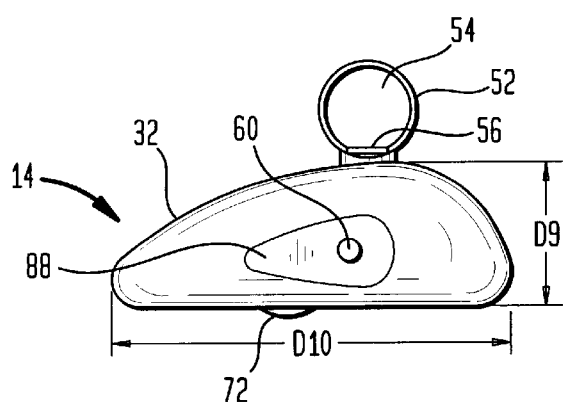
Figure 5C:
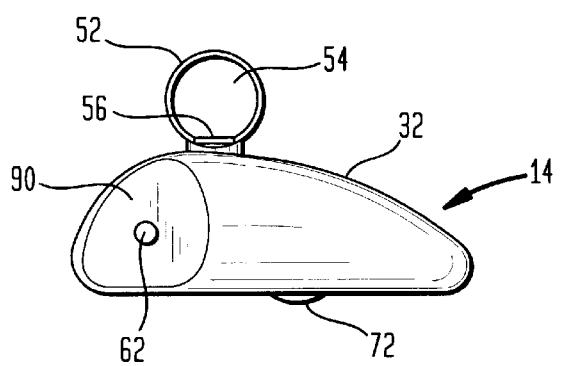
Figure 6:
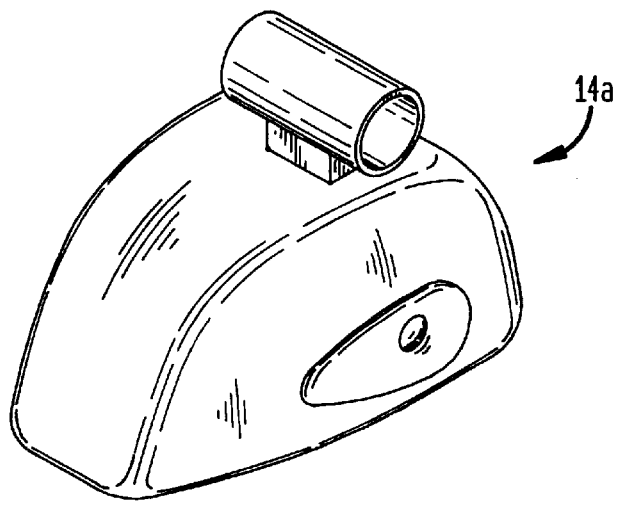
Figure 7:
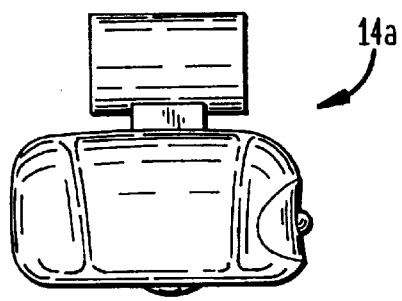
Figure 8:
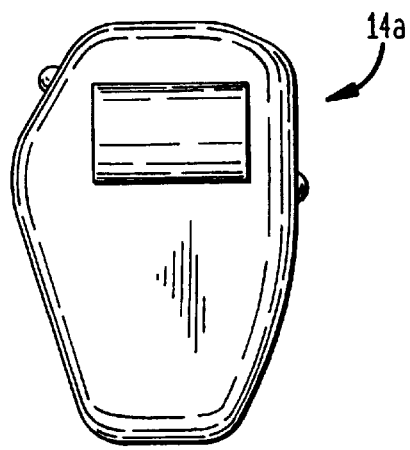
Figure 9:
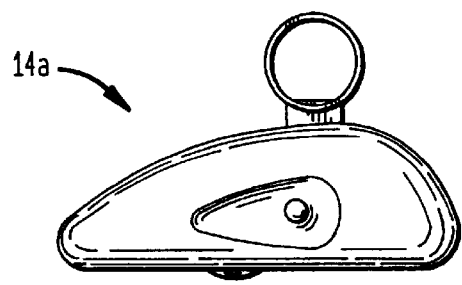
Figure 10:
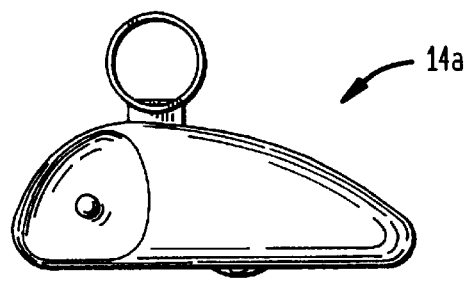
Figure 11:
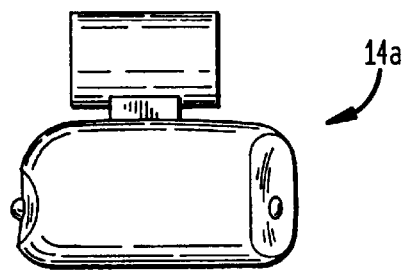
Figure 12:
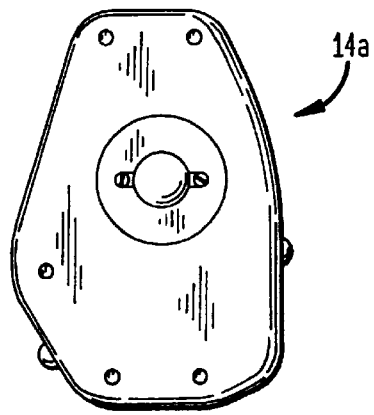
Figure 13:
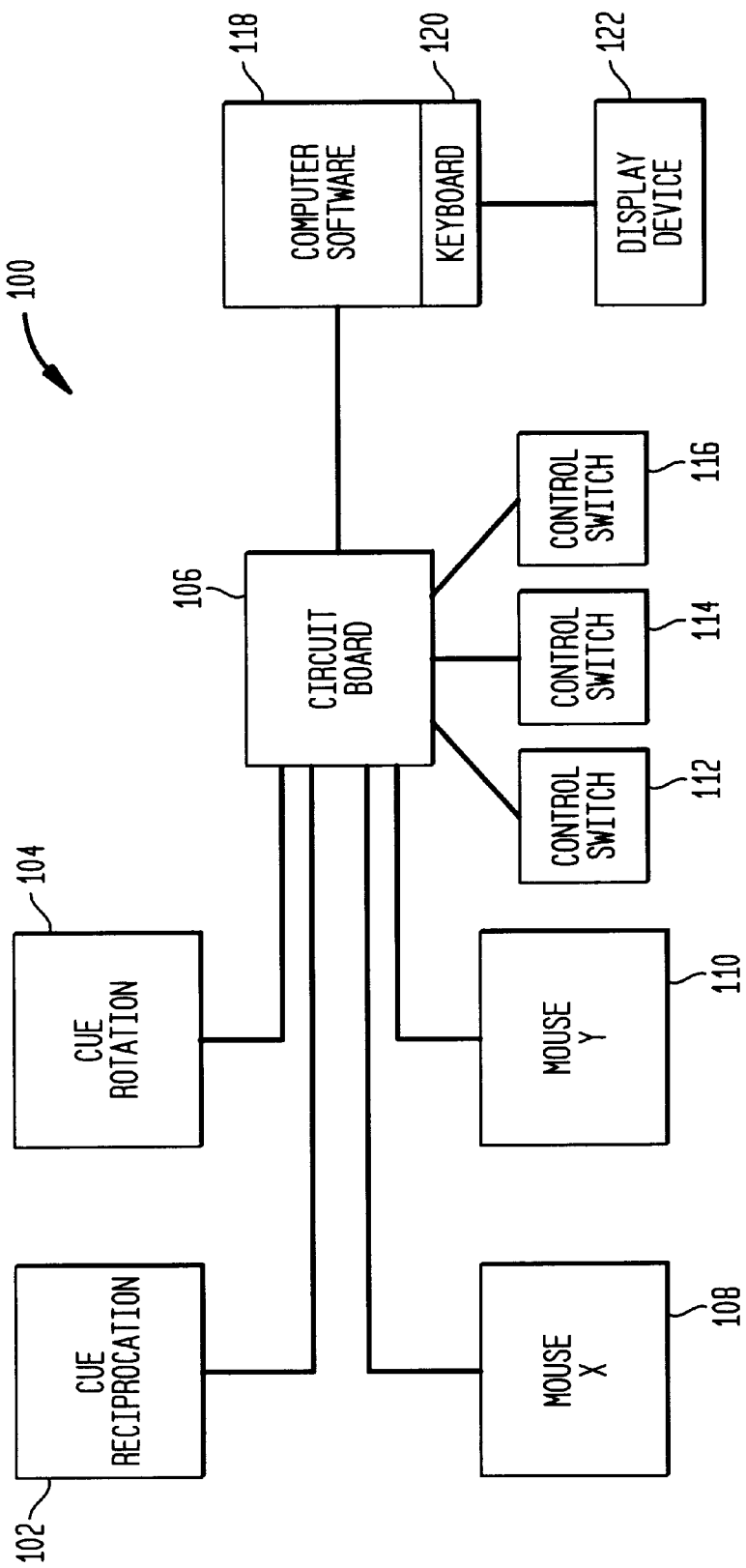
Figure 14A:
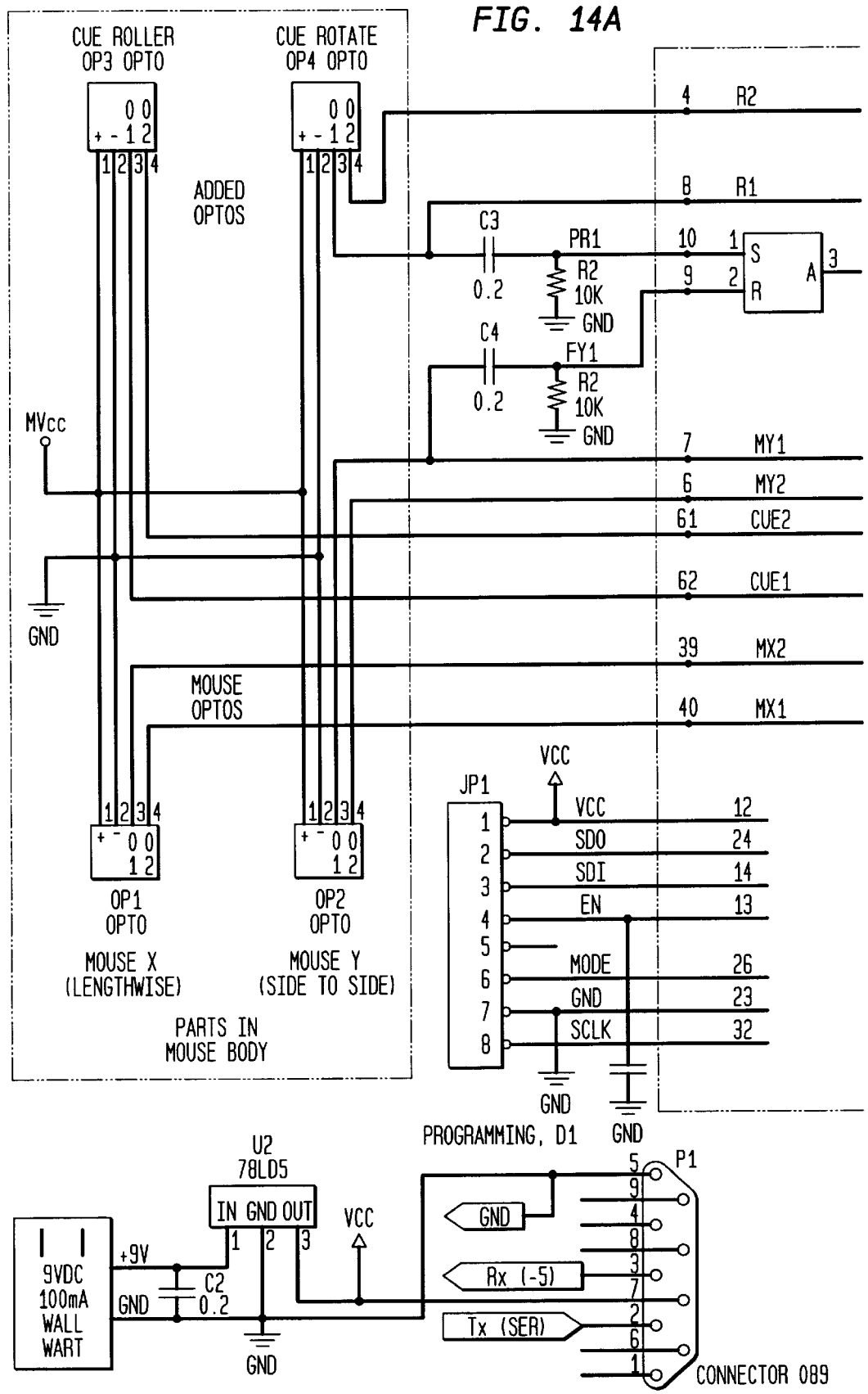
Figure 14B:
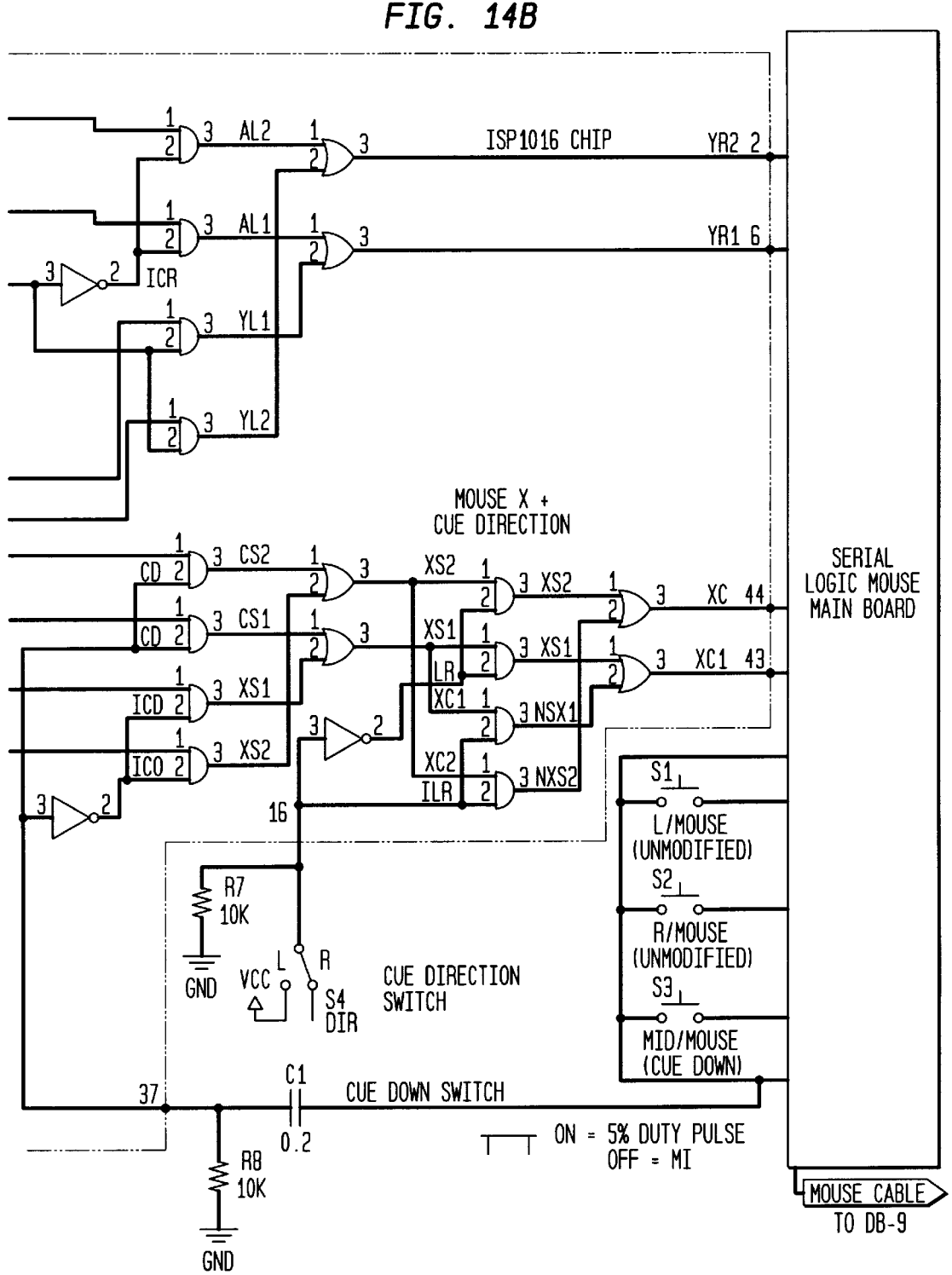
Figure 15A:
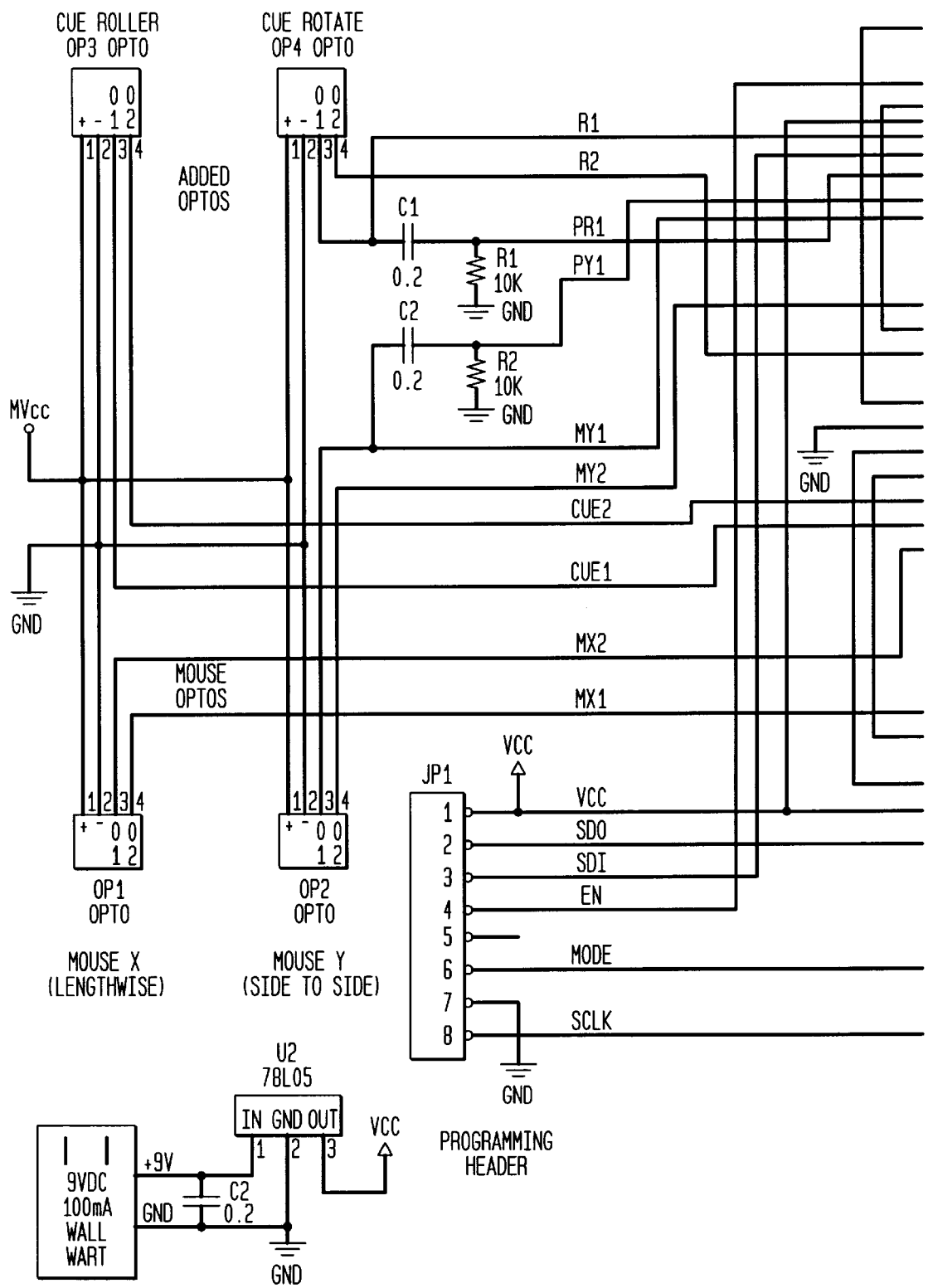
Figure 15B:
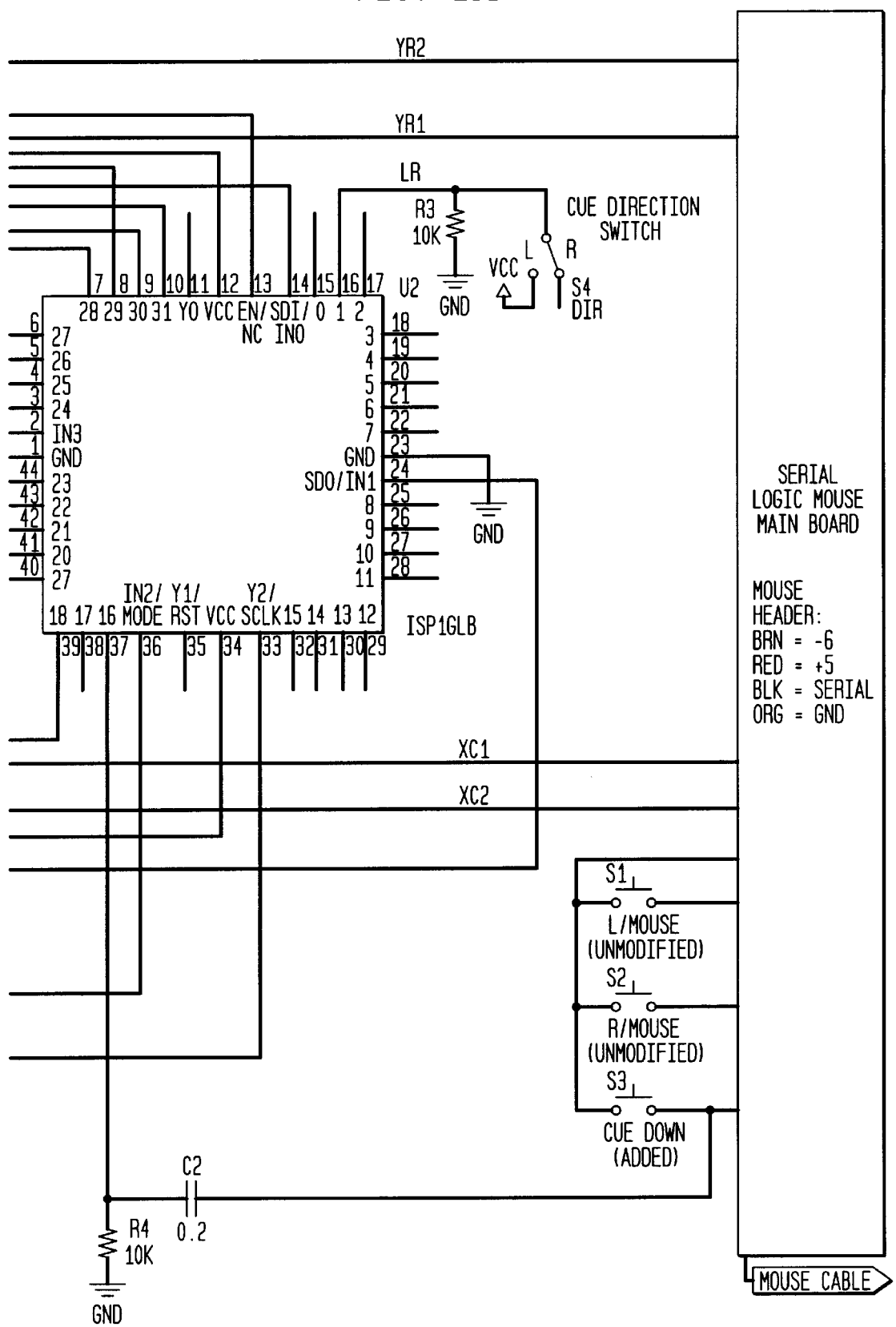

PIG. 2 is a top plan view of the computerized pool cue and controller of the present invention being used for a game of pool;

PIG. 3 is a partial cross sectional view of the pool cue according to the present invention;

PIG. 4 is a partial cross sectional view of the controller according to the present invention;

FIGS. 5A–5C are top, right and left side views, respectively, of the controller according to the present invention;

FIGS. 6–12 include views of a preferred embodiment of the pool cue controller according to the present invention, of which:

FIG. 6 is a perspective view of the pool cue controller,

PIG. 7 is a rear elevational view thereof,

FIG. 8 is a top plan view thereof,

FIG. 9 is a right side elevational view thereof,

FIG. 10 is a left side elevational view thereof,

FIG. 11 is a front elevational view thereof,

FIG. 12 is a bottom plan view thereof;

FIG. 13 is a block diagram of a system of operation the present invention; and FIGS. 14 (shown over FIGS. 14A and 14B); and 15 (FIGS. 15A and 15B) are schematics for the pool cue controller according to the present invention.

DETAILED DESCRIPTION OF THE PREFERRED EMBODIMENTS

Figure 2:
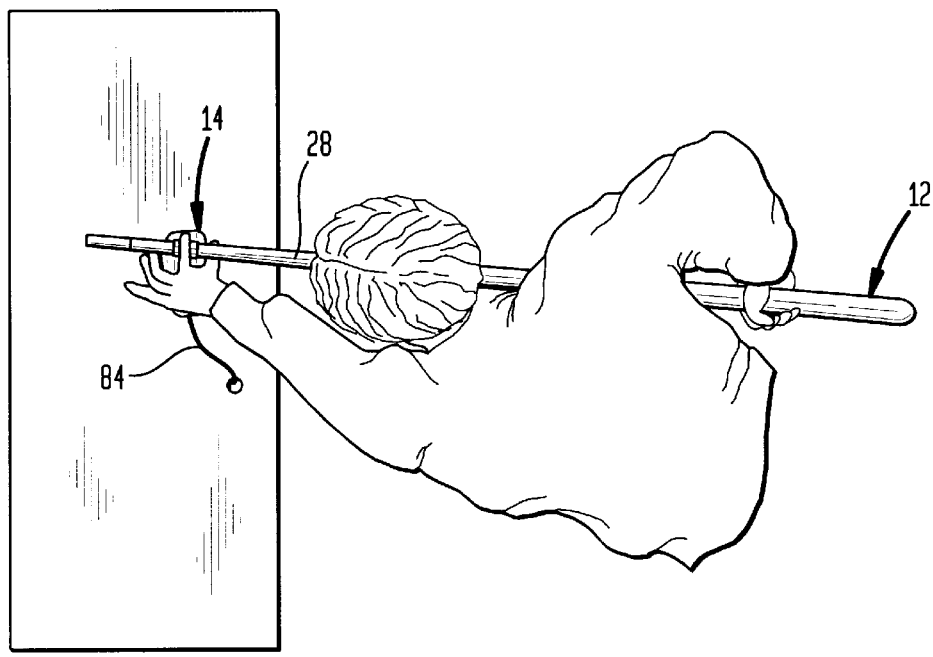

The present invention indicated generally at 10 includes a computerized cue stick 12 (hereinafter "cue") and a controller 14 as shown in FIGS. 1 and 2. The mounting of the cue 12 with the controller 14 and the coaction therewith is shown in FIG. 1. FIG. 2 shows the hand and finger placement employed to use the present invention. As shown in FIG. 2, it is apparent how similar the grasping and manipulation of the cue 12 and controller 14 resembles actually holding a cue stick and supporting it with the opposite hand to effect a pool "shot". FIGS. 3–5C show with more particularity the elements of the computerized cue 12 and controller 14 according to the present invention.

FIG. 3 shows with more particularity the cue 12 of the present invention. The cue 12 is constructed to be of regulation length, although the cue can be constructed to other lengths depending upon the arm length and "reach" of the user. The cue 12 is manufactured from known materials, such as wood, plastic or graphite components. The cue tapers from an end 16 or butt portion toward a tip 18 to contact a pool ball (not shown).

The cue 12 can be constructed as two separate portions with a forward portion 20 having a threaded bolt 22 to releasably engage a threaded insert 24 of a rear portion 26. The bolt 22 is preferably at least 1½ inches long and ⅜" wide.

A coating 28 is applied to a select area of the forward portion 20. The coating 28 is similar to the rubber compound used to manufacture a ball of a computer mouse. The coating 28 extends continuously along the forward portion 20 of the cue 12 for a predetermined length. The rear 26 or gripping portion of the cue 12 is provided with the conventional rubber grip 30 to facilitate control of the cue stick 12 during game play.

The dimensions of the cue 12 in FIG. 3 are designed to accommodate the arm length of the user, with preferred dimensions as follows:

D1=38 inches

D2=19 inches

D3=17 inches

D4=1 inch

D5=1 inch

D6 - ½ inch

D7=1 inch

Other dimensions for the elements D1–D7 discussed above are also suitable for the invention.

Figure 4:
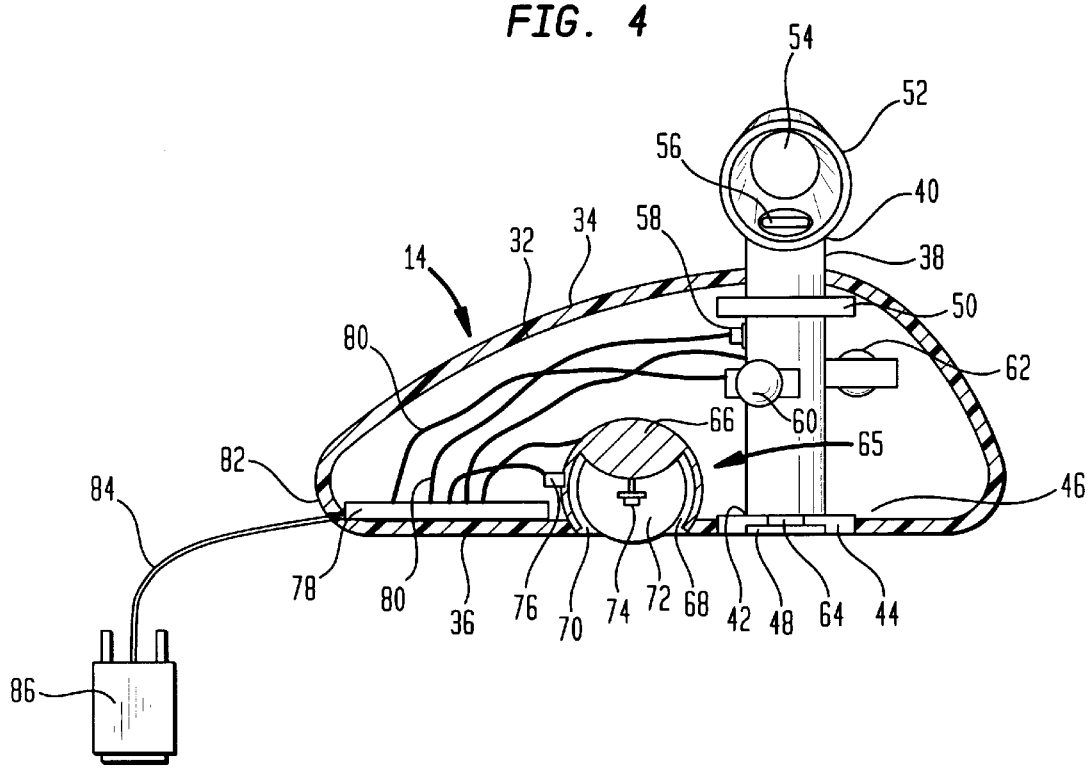

Referring to FIG. 4, the controller 14 of the present invention is shown without the cue 12 mounted thereto. The controller 14 includes a case 32 to house elements of the controller 14. The case 32 is composed of plastic, light alloys or other composite materials, and has an upper surface 34 and a lower surface 36.

A stalk or arm 38 with opposed upper end 40 and lower end 42 extends through the case 32 from between the lower surface 36 and the upper surface 34, so that the upper end 40 protrudes from the upper surface 34 of the case 32. The stalk 38 is rotatably mounted within the case 32 with the lower end 42 seated in a mounting 44 at a bottom 46 of the case 32. A tension spring 48 is disposed at the mounting to contact and bias the stalk mount. A support 50 for the stalk is disposed at the interior of the case 32 to encircle an exterior surface of the stalk 38 proximate to where the stalk 38 protrudes from the upper surface 34 of the case 38. The support 50 also functions as a stop to prevent the stalk from being extracted from the housing.

A control ring 52 is mounted to the upper end 40 of the stalk 38. The control ring 52 includes a passageway 54 in which the cue 12 is received for reciprocating movement. A first optical reader 56 is mounted in the control ring 52 to sense movement of the cue 12 through the control ring 52. A second optical reader 58 is mounted to the exterior surface of the stalk 38 and is activated by the rotational movement of the stalk 38 about its longitudinal axis.

A first control button 60 is mounted to extend from a right or thumb side (see also, for example, FIG. 5B) of the case 32. A second control button 62 is mounted to a finger or left side (see also, for example, FIG. 5C) of the case 32. Referring to FIG. 4 a third control button 64 is mounted at the lower end 42 of the stalk 38 and is activated by pressure exerted on the tension spring 48 at the bottom 46 of the case 32.

Still referring to FIG. 4, a subassembly to signal further movement of the case 32 along the X and Y axis, and any directional angle therebetween, is generally indicated at 65 and arranged at the interior of the case 32. The subassembly includes a circumferentially shaped wall 66 forming a chamber 68 having an opening 70 in communication with an exterior of the case 32 at the bottom 46 of the case. A spherical member, such as a mouse ball 72 is rotatably mounted in the chamber 68, such that a portion of the ball 72 extends through the opening 70 to contact and support the case 32 for movement over an underlying surface (not shown). A third optical reader 74 is mounted to the circumferentially shaped wall 66 to generate signals responsive to movement of the mouse ball 72 along the X axis. A fourth optical reader 76 is also mounted to the circumferentially shaped wall 66 to generate signals responsive to movement of the mouse ball 72 along the Y axis.

A circuit board 78 is mounted at the interior of the case 32. Wiring 80 interconnects the circuit board 78 with the elements aforementioned. An aperture 82 is formed at a rear of the case 32 through which a lead 84 for a communications port plug 86 extends for connection to the circuit board 78.

In FIGS. 5A–5C, views of the case 32 for the controller 14 according to the present invention are shown. The first and second control buttons 60,62 are shown, respectively, extending from their respective sides of the case 32. The right or thumb side of the case 32 in FIG. 5B is formed with a first depressed region 88 from which the first control button 60 protrudes for activation. The first depressed region 88 cradles the user's thumb and provides comfort when holding the case 32. The first region 88 permits the user to activate the first control button 60 with practically any portion of the thumb.

The finger or left side of the case (FIG. 5C) is similarly provided with a second depressed region 90 from which the second control button 62 protrudes for activation. The second depressed region 90 also provides for increased ergonomics and comfort for the user's fingers, as well, permitting a substantial portion of the user's finger to depress and actuate the second control button 90. The first and second control buttons 60,62 and control ring 52 enable simulation of the movement of the cue 12, as well as the "English" that the user can effect on the game ball.

Referring to FIGS. 5A and 5B, a preferred series of dimensions for the controller 14 are as follows:

D8=2-½ inches

D9=1-¼ inches

D10=3-½ includes

Although the dimensions indicated for D8–D10 are preferred, these dimensions are by way of example only, and other dimensions can be employed for the case 32 of the controller 14 of the present invention, depending upon the size, strength and dexterity of the user's hand.

In operation, the cue 12 is fitted through the control ring 52 to activate the first optical reader 56. As the cue 12 is moved, the coating 28 contacts and activates the optical reader 56. The case 32 is grasped and moved along the X and Y axes, as well as movements therebetween, so that the user is in effect using a combination computer mouse and a joy stick. This permits the cue to be tilted through a variety of angles to effect the necessary "English" to control the pool ball.

The user then observes a display device 122 FIG. 13, such as a computer screen for the computer into which the plug 86 is connected. Movement of the case 32 along the X and Y axes translates into movement as shown on the computer screen with respect to game balls on the computer screen. As the user maneuvers the case 32 and the cue 12 associated therewith, the user views the computer screen to align the tip 18 of the cue 12 with respect to the ball to be hit, either off another ball or into a pocket of the pool game simulated on the computer screen. Movement of the cue 12 by the user through the control ring 52 is sensed by the optical reader 56 so that the user actually sees movement of the cue on the computer screen, and in particular, the tip 18 of the cue 12 with respect to the intended contact with a game ball.

The control ring 52 for the cue 12 and the third control switch 64 at the bottom 46 of the case 32, and the X and Y optical readers 56,58 are interconnected for coaction as described further. The first optical reader 56 in the control ring 52 is actuated when the control ring 52 is pushed downward against the surface underneath the case 32 to depress the third control switch 64 at the bottom 46 of the case 32. This action transmits a SHOOT command to the system software. As the third control switch 64 is being depressed, the X and Y optical readers 56,58 are disabled, i.e. since the user is performing a shot on the game ball, there is no reason that further movement would occur along the X and Y axis or any angle therebetween. After the SHOOT command, the user relieves the pressure on the control ring 52 so that the first and second (X and Y, respectively) optical readers 56,58 are again actuated for a subsequent shot at the game ball. Rotation of the stalk 38 is used as a fine adjustment for aiming the cue 12 prior to taking a shot. That is, after the case 32 is moved by the user with his hand to effect the optimum position for the cue 12 to contact the game ball, the stalk 38 is rotated to mimic the finite adjustments of the human wrist to perfect the shot.

When the second control button 62 at the finger side of the case 32 is depressed (the left mouse button), a ZOOM command is generated to the computer. When pressure is released from the second control button 62, aiming control is again available to the user.

Use of the computerized pool cue and controller of the present invention 10 provides the user with a "virtual pool" simulation incorporating standard mouse and keyboard commands to control the software.

Preferably, the control ring 52 for the cue 12, the stalk 38 and the third control button 64 will substitute for the control functions frequently used with the S key and X mouse movement as shown in the following chart. The preferable keyboard commands for controlling the system software for the invention with conventional keyboards is as follows:

| Keystroke | = | Command |
| --- | --- | --- |
| A | | Aim Cue |
| S | | Shoot Ball |
| E | | Move Cue Tip on Ball (English) |
| Left Mouse Button Hold | | Zoom in and Out |
| B | | Raise Butt of Cue (Masse' Shots) |
| CTRL | | Toggle Fine Tune Aiming |
| V | | Change View |
| M | | Move Ball |
| C | | Move Center Point of View |
| X | | Snap to Overhead View |
| F | | Vary Tracking Force Lines |
| H | | Select Ball to Move |
| SHIFT | | Toggle Amplify (Used for First Rack Break) |
| L | | Toggle Table Lines ON/OFF |
| O | | Overhead View |
| R | | Replay Last Shot |
| T | | Tracking Lines |
| U | | Undo |
| Z | | Zip to Results |
| ESC | | Main Menu |

FIGS. 6–12 show a preferred embodiment 14a of the pool cue controller. The controller 14a is ergonomically shaped to facilitate gripping and accurate shooting of the pool cue 12 and provides for a comfortable grip of the device. The controller 14a includes the elements of the controller 14 and operates in the same way.

Referring now to FIG. 13, a system block diagram 100 for the invention includes elements which provide for cue reciprocation 102 and rotation 104. A circuit board 106 interconnects elements 102, 104 for cue reciprocation and rotation, respectively, with mouse X 108 and mouse Y 110. Control switches 112, 114, 116 are connected to the circuit board 106. Computer software 118 connected to the circuit board 106 is controlled at a keyboard 120. A display device 122 such as a computer monitor is connected to the computer software 118.

FIGS. 14 and 15 show schematic representations of the wiring for the pool cue controller 10 according to the present invention.

It will be understood that the embodiments described herein are merely exemplary and that a person skilled in the art may make many variations and modifications without departing from the spirit and scope of the invention. All such modifications and variations are intended to be included within the scope of the invention as defined by the claims herein.

What is claimed is:

1. A method for simulating pool or billiard games, the method comprising the steps of;

supporting a pool stick above an underlying surface;

controlling movement of the pool stick in at least two dimensions above the underlying surface;

sensing movement of the pool stick;

generating a signal of the movement of the pool stick above the underlying surface to a visual display;

adjusting movement of the pool stick with respect to the position of the pool stick shown on the visual display to position the pool stick with respect to a game ball shown on the visual display; and moving the pool stick to generate a signal simulating contact of the pool stick with the game ball on the visual display.

2. The method according to claim 1, wherein the step of sensing movement of the pool stick includes the steps of:

sensing reciprocal movement of the pool stick along its longitudinal axis, sensing rotational movement of the pool stick, sensing elevational movement of the pool stick with respect to the underlying surface, and sensing angular movement of the cue stick with respect to the underlying surface.

3. The method according to claim 1, wherein the step of sensing includes the step of:

optically monitoring movement of the pool stick with respect to the underlying surface.

4. The method according to claim 1, further comprising the step of:

depressing the pool stick downward toward the underlying surface; and disabling movement of the pool stick and the game balls on the visual display simultaneously with the step of depressing the pool stick.

5. The method according to claim 1, wherein the step of supporting includes the step of:

retaining the pool cue in the position selected to generate a signal to the visual display simulating contact with a game ball.

\* \* \* \* \*